G. P. MALLORY.
MACHINE FOR FORMING SPOONS AND OTHER FLATWARE ARTICLES OUT OF SHEET MATERIAL.
APPLICATION FILED NOV. 20, 1919.

1,378,707.

Patented May 17, 1921.

INVENTOR:
George P. Mallory
by Macleod, Calver, Copeland & Dike
Attys.

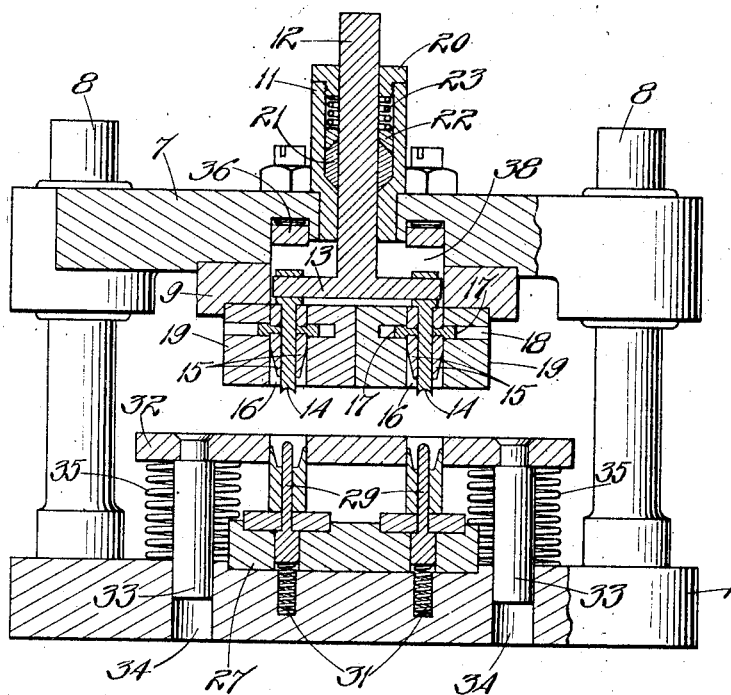

UNITED STATES PATENT OFFICE.

GEORGE P. MALLORY, OF YORKLYN, DELAWARE, ASSIGNOR, BY MESNE ASSIGNMENTS, TO SANITARY PRODUCTS CORPORATION OF AMERICA, OF PHILADELPHIA, PENNSYLVANIA, A CORPORATION OF VIRGINIA.

MACHINE FOR FORMING SPOONS AND OTHER FLATWARE ARTICLES OUT OF SHEET MATERIAL.

1,378,707. Specification of Letters Patent. Patented May 17, 1921.

Application filed November 20, 1919. Serial No. 339,283.

*To all whom it may concern:*

Be it known that I, GEORGE P. MALLORY, a citizen of the United States, residing at Yorklyn, county of New Castle, and State of Delaware, have invented a certain new and useful Improvement in Machines for Forming Spoons and other Flatware Articles Out of Sheet Material, of which the following is a specification, reference being had therein to the accompanying drawings.

The invention is especially intended for use in making paper or fiber spoons, but it is adapted to use in making spoons or other flatware articles out of any suitable sheet material.

The invention is an improvement on the machines shown in the United States Letters Patent No. 1,227,534 to Frankland, No. 1,241,517 to L. D. Jacoby, and No. 1,258,414 to L. D. Jacoby.

In the Jacoby patents above mentioned there is shown and described a machine having a stationary lower die and a movable upper die mounted in a vertically movable holder, said upper die having a bowl and handle forming portion which is rigidly connected with the die holder and having an intermediate portion which forms the shank, said intermediate portion being yieldingly connected with the die holder in such manner that in its downward movement it moves with the handle and bowl forming portions but is slightly movable with relation thereto under certain conditions, and means are provided so that on the up stroke of the movable die holder said intermediate shank forming portion is caused to check its movement at a certain point while the handle and bowl forming portions continue to move upward, said intermediate portion thus acting as an ejector to release the spoon from the die to which it has a tendency to cling.

The particular form of spoon which the machine of the aforesaid patents is especially intended to make has a shank portion which is convex in cross section, and the machine has means for engaging the sheet at the shank forming portion to clamp it against the portion of the lower die over which the concave side of the shank is bent, the dies and clamping mechanism being so adjusted that the shank portion of the spoon blank will be clamped against the portion of the lower die over which the concave side of the shank is to be bent before the co-operating upper die for the convex side of the shank begins to bend the shank portion.

One feature of the invention relates to the double die combination. Another feature of the invention relates to the knock-out mechanism for disengaging the spoon from the die after the spoon is formed. Another feature relates to the die holder shank. Another feature relates to the shank formers. Other features of the invention relate to details in construction and will be more particularly set forth hereinafter.

For convenience of illustration and description the invention is shown as embodied in a machine for making spoons.

The invention will be fully understood from the following description when taken in connection with the accompanying drawings, and the novel features thereof will be pointed out and clearly defined in the claims at the close of the specification.

In the drawings, Figure 1 is a front elevation of a machine embodying the invention.

Fig. 2 is a vertical transverse sectional view showing the machine with the dies in their separated position.

Fig. 3 is a similar view to Fig. 2, showing the dies in their closed position.

Fig. 6 is a detail plan view of the split bushing.

Figure 4:
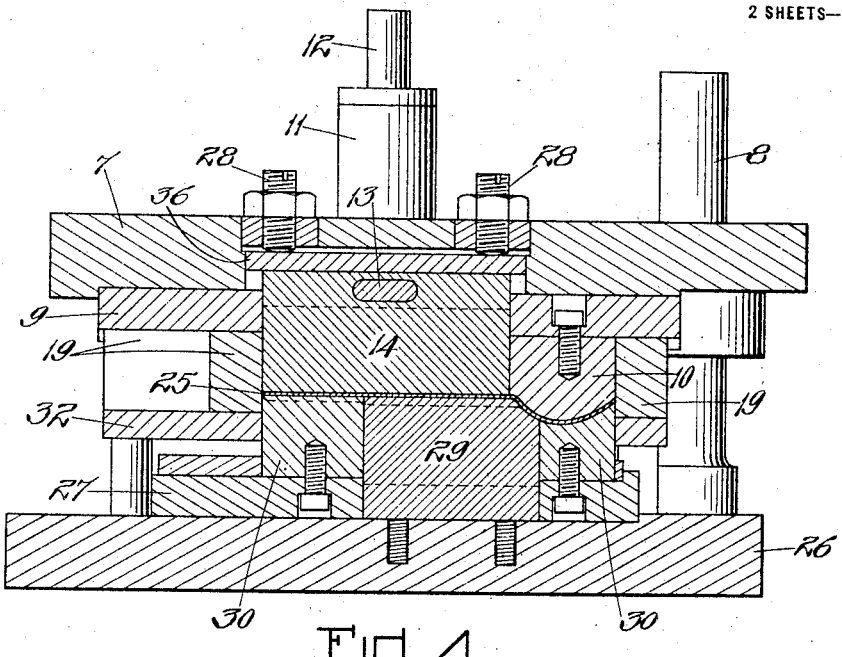
Fig. 4 is a vertical longitudinal sectional view showing the dies in their closed position and a spoon in its completed form between the dies.

Referring now to the drawings, 1 represents the base and 2 the upright portions of the frame. Within the uprights 2 there is journaled a crank shaft 3 which may be operated in any suitable manner. Mounted on the shaft 3 are crank arms 4 which are suitably connected with a pitman 5, said pitman 5 being connected with a crosshead 6 which has a vertically reciprocable movement. Said crosshead 6 is connected at its lower end with the upper die plate 7 which is movable on guides 8.

Figure 5:
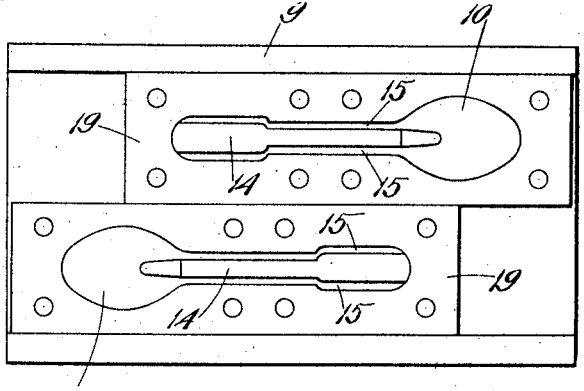
Fig. 5 is a bottom plan view of the upper die.

Secured to or formed integral with the die plate 7 is a die holder 9, to the under side of which are secured two bowl forming die members 10 pointing in opposite directions, one of which is preferably secured to the die holder near the right-hand end, and the other of which is secured to the die holder near the opposite end, said two die members 10 being preferably in staggered relation to each other, as shown in Fig. 5, so that the two dies may lie parallel with each other in the same plane and economize space in the arrangement.

Figure 1:
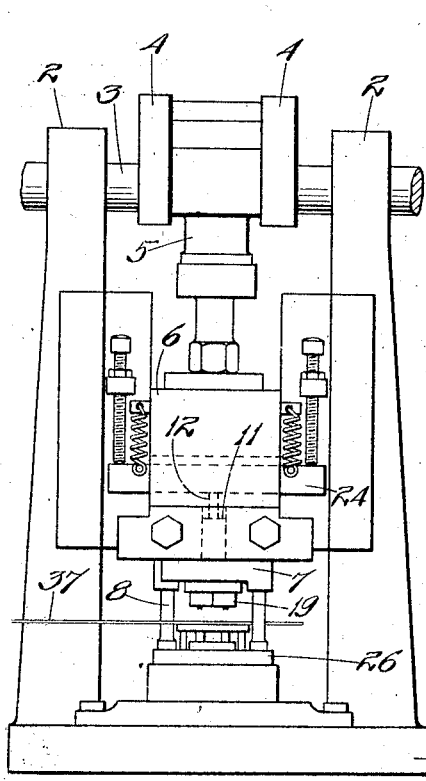

The die plate 7 is formed with an upwardly extending hollow stem 11 which is rigidly attached to the crosshead 6, said crosshead, die plate and stem 11 all being movable together, as shown in Fig. 1. Mounted within said hollow stem 11 is a rod 12 which is capable of a sliding movement within said stem 11. To the lower end of said rod 12 is secured a crossbar 13 which extends laterally on both sides of the rod 12, said cross-bar 13 and rod 12 being together of inverted T-shape. To the opposite ends of the crossbar 13 are secured the shank forming and clamping die members 14 which respectively coöperate with the bowl forming die members 10.

The lower ends of the shank forming die members 14 are preferably concave, as shown in Figs. 2 and 3, so as to give a convex formation to the upper face of the shank of the spoon. The members 14 also serve to clamp the blank to the lower die members 29 during the further action of the dies, and serve as knock-out members, as will be hereinafter described.

In addition to giving the convex formation to the intermediate portion of the shank of the spoon, it is desirable that the side portions of the shank of the spoon should be given a still further downward bend, and to this end there are provided shank bending members 15 on opposite sides of each of the shank forming members 14 which are capable of a vertical sliding movement at certain periods in the operation of the machine independent of the vertical movement of the members 14. There is a pair of these bending members 15 employed in combination with each of the shank forming members 14, but separate therefrom. The members 15 are rigidly connected with the bowl forming members and preferably integral therewith. Each pair is located in one of the vertical apertures 16 through which the shank forming members 14 extend as shown in Figs. 2 and 3. In order to provide for the movement of the shank bending members 15 and the bowl forming member 10 with relation to the shank clamping member 14, the combined bowl and shank bending members are made separate from the clamping member 14. Pins 17 which fit loosely in horizontal apertures 18 in the cutting dies 19 pass through the bending members 15. These pins help support the bending members and allow them a slight movement. This construction also provides means for easily cleaning out any accumulation of scrap that may be carried into the dies during the process of manufacture as the dies may be easily removed.

The lower portion of the aperture in the die holder stem 11 is constructed so as to just form a loose fit for the rod 12, and the upper end of the stem 11 is provided with a screw cap 20 which is apertured to form a sliding fit for the rod 12. The die holder stem 11 is machined out to form an enlarged interior within which there is provided a split bushing 21 preferably made of box wood to form a friction bearing for the rod. Said bushing is beveled at the top and bottom. On the upper side of said friction bushing 21 is a cap 22 which is beveled to fit the beveled upper face of the bushing and is held in engagement with said bushing 21 by a spring 23, the lower end of said spring 23 resting upon the upper surface of the cap 22 and the upper end of said spring engaging with the lower end of the screw cap 20. The seat for the bushing in the stem 11 is beveled to correspond with the bushing. The spring 23 exerts pressure on the cap 22, thus forcing the friction bushing 21 against the knockout rod 12. The friction of the bushing 21 is sufficient so that the rod 12 and its connected crossbar 13 with the shank forming dies 14 will move up and down with the bowl forming dies 10 and shank bending members 15 except when the rod 12 meets with resistance in its upward stroke while the stem 11 of the die is still moving upward. When the rod 12 does thus meet with resistance by striking against the stop member 24 (see Fig. 1), as will be hereinafter described, the shank bending members 15 and bowl forming member together with the stem 11 will continue to move upward with the die plate 7 while the rod 12 is held stationary, thus causing a movement of the cutting dies 19 and the bowl forming dies 10 and bending members 15 with relation to the crossbar 13 and shank forming and clamping dies 14, whereby the shank forming dies 14 will serve as ejectors to release the formed spoons 25 from adhesion to the bowl forming dies. Adjusting screws 28 in the plate 7 act through a buffer plate 36 upon the shank forming and clamping members 14.

The lower die plate 26 has mounted thereon the guides 8, and also has mounted thereon the die holder 27 which holds the lower shank forming dies 29 and lower bowl and handle forming dies 30. The shank forming die 29 is seated on springs 31, so that it is capable of a vertical yielding movement when the upper die 14 presses the blank down upon the lower dies 29 and 30. The die members 30 are rigidly connected with the die plate 27.

A stripper plate 32 which is cut out to receive the lower die by a sliding fit is mounted on guide posts 33, which extend down through guideways 34 in the lower die plate 26, and the said stripper plate 32 is seated upon springs 35 as shown in Fig. 2. The said stripper plate yields downwardly to the pressure of the upper cutting dies 19, and upon the retraction of the upper dies the said stripper plate 32 will rise under the upward action of the springs 35.

In the operation of the machine, the sheet 37 from which spoon blanks are cut will be fed by any suitable mechanism between the upper and lower dies when the dies are separated from each other, then the sheet will remain stationary while the cutting dies are performing their operation. It is not deemed necessary to show the sheet feeding mechanism. Assuming now that the upper die members are starting on their downward stroke, the parts will be in the position as shown in Fig. 2. The shank clamping and forming members 14 project normally slightly below the cutting dies 19 so that the members 14 will clamp the sheet against the lower shank forming members 29 before the cutting of the blanks take place. The cutting dies 19 together with the bowl forming dies 10 will continue to descend while the clamping members 14 remain stationary.

The cutting members 19 will cut out the blanks of a suitable contour from the sheet and press down upon the spring-seated stripper plate 32, which will be depressed as shown in Fig. 3, and the bowl forming die members 10 will form the bowl of the blank by coöperation with the lower bowl forming dies 30. The cutting dies 19 and the separator plate 32 will be carried down below the outer periphery of the bowl forming die members by reason of the fact that the separator plate is spring-seated and the bowl-forming die members are rigid. The upper die plate 7 is formed with a recess 38, (see Fig. 2), which is of sufficient depth to allow for a vertical movement of the shank forming members 14 and the crossbar 13 with relation to the coöperating dies 19 and the flange forming members 15 of the shank forming dies.

By reason of the fact that the knock-out rod 12 is slidable within the tubular stem 11, as already described, it follows that after the blanks have been clamped by the members 14 to the lower shank forming dies 29, and the bowl forming dies 10 and the cutting dies 19 continue their descent, that the flange forming die members 15 which are connected with the cutter dies 19, as already described, will move down below the lower end of the shank forming members 14 and engage the side portions of the blank on opposite sides of the lower shank forming dies 29 and bend those flanges downward, as shown in Fig. 3.

On the upstroke of the upper die plate 7 the stripper plate 32 will be carried upward to its normal position by the springs 35 upon which it is seated.

There is a tendency for the spoon blank to cling to the upper die and rise with it. As soon as the upper die plate with the die holder and cutters, bowl forming dies and flange forming die members have been carried as one far enough for the knock-out rod 12 to engage with the stop member 24, as shown in Fig. 1, said knock-out rod will come to a standstill while the die plate 7 and the other members carried thereby continue to move slightly further upward. This will cause the crossbar 13 and the clamping die members 14 to be brought into the lower part of the recess 38, as shown in Fig. 2, and the shank forming members 14 will project below the cutter dies 19. This causes the shank forming members 14 to serve as knock-outs to release the formed spoons from their adhesion to the dies.

The buffer 36 at the upper end of the recess 38 serves as a bumper for the shank forming members 14 on the down stroke of the upper die plate 7 when the members 14 come to their clamping engagement with the lower shank forming dies 29 while the remaining members of the upper die move further downward.

What I claim is:—

1. A machine for forming articles out of sheet material, having in combination a movable cutting die formed with a vertical opening therethrough, a clamping member movable within said opening, a forming member having two side branches which serve as bending members lying in said opening on opposite sides of the said clamping member, the walls of the cutting die being formed with horizontal pin holes opening into the vertical passage in which the said forming and clamping members are located, and pins which fit loosely in said horizontal holes and pass through holes in the forming members.

2. A machine for forming articles out of sheet material, having in combination a movable cutting die formed with a vertical opening therethrough, a forming die located in said opening having two downwardly extending portions for bending two opposite side portions of a blank, a movable knock-out member which extends down between said forming members, said knockout member being vertically movable with relation to the cutting die and forming members, the said downwardly extending forming members and the walls of the cutting die at the sides of the said opening being formed with horizontal apertures in alinement with each other, and a pin which fits loosely in each of said apertures in the cutting die and extends through the aperture in the adjacent forming member.

3. A machine for forming flatware articles out of sheet material, having a cutting die for the blanks, an upper and a lower impression die, a holder for said dies, a clamping member carried by said holder for clamping the blank to the lower die on the downward movement of the die holder, the upper impression die having two forming members located on opposite sides of said clamping member, said cutting die having a vertical opening to receive the said clamp and side forming members, said side forming members and the walls of the cutting die having horizontal apertures in alinement with each other, and pins which fit loosely in the said apertures in the walls of the cutting die and pass through the holes in the adjacent forming members.

In testimony whereof I affix my signature.

GEORGE P. MALLORY.